United States Patent Office.

WILLIAM G. ESSER, OF MILWAUKEE, WISCONSIN.

Letters Patent No. 65,892, dated June 18, 1867.

IMPROVED COMPOUND FOR TEMPERING STEEL.

*The Schedule referred to in these Letters Patent and making part of the same.*

TO ALL WHOM IT MAY CONCERN:

Be it know that I, WILLIAM G. ESSER, of Milwaukee, Milwaukee county, Wisconsin, have invented a new and improved Compound for Tempering Tools; and I do hereby declare that the following is a full, clear, and exact description thereof, which will enable others skilled in the art to make and use the same.

The object of this invention is to furnish a compound for tempering stone-cutters' tools, and especially mill-picks, in such a manner that they shall be much more durable than when tempered in the ordinary manner.

It is well known that much valuable time is lost by the workman in consequence of having badly tempered tools in working in stone. Especially is this the case with the miller who uses the mill-pick. After many experiments I have discovered that certain chemical compounds produce surprising effects upon steel in the process of tempering. The difficulty has always been in making the cutting edge of the tool sufficiently hard without injuring the texture of the steel. This cannot be done in water alone, and consequently oil and various solutions have been resorted to, but with very poor success.

My invention consists in forming a compound composed of the following substances, viz., carbonate of potash, three pounds; saltpetre, three pounds; sea or rock salt, three pounds, dissolved in six gallons of soft water, to be used within twenty-four hours after mixing.

What I claim as new, and desire to secure by Letters Patent, is—

A compound for tempering steel tools, composed of the above ingredients in about the proportions named.

The above specification of my invention signed by me this 26th day of January, 1867.

WILLIAM G. ESSER.

Witnesses:
J. S. CLARK,
GEORGE W. GOVE.